April 24, 1962  F. G. JORDAN  3,030,856
KALEIDOSCOPE PROJECTING APPARATUS
Filed July 14, 1958  2 Sheets-Sheet 1
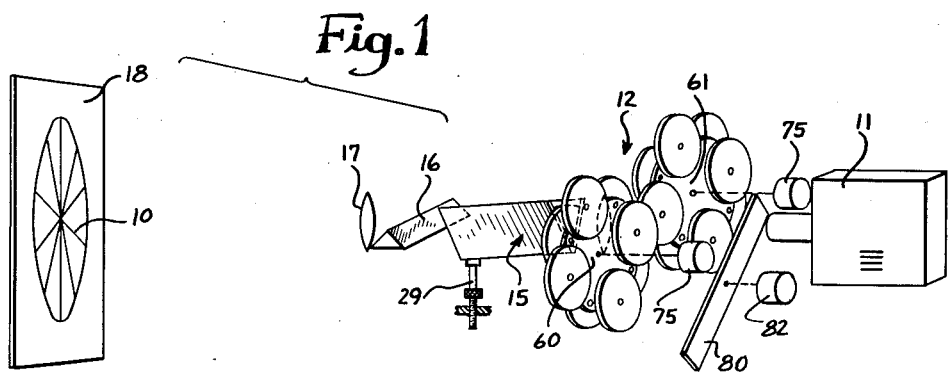
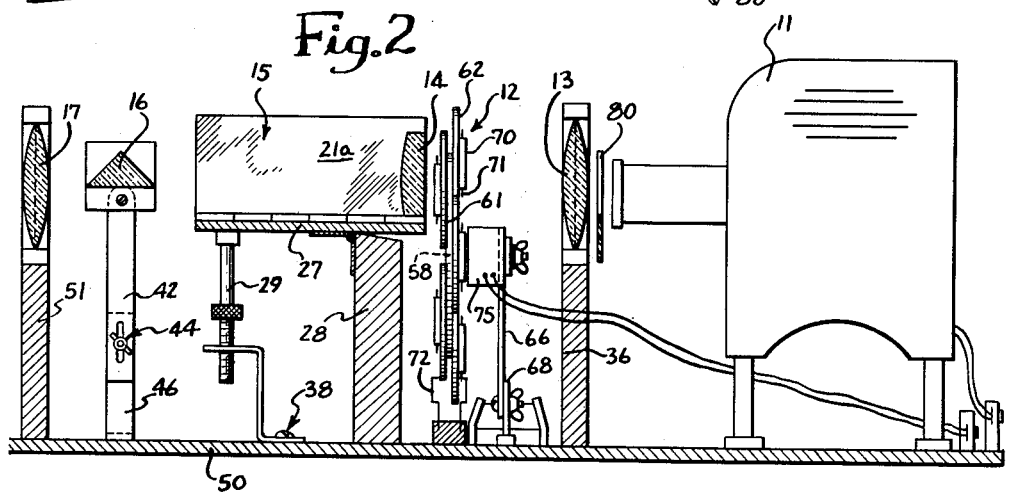
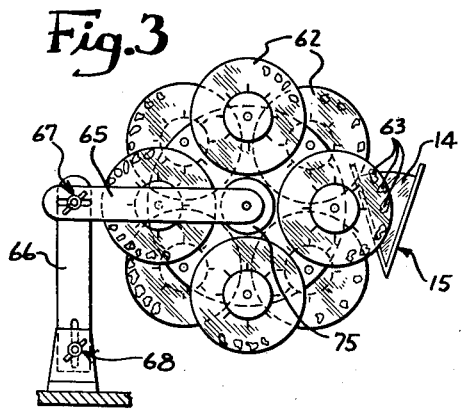
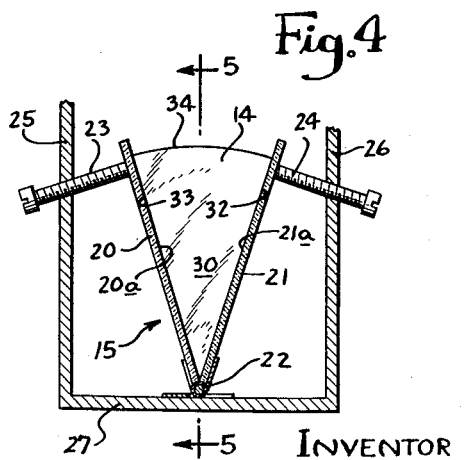
INVENTOR
FRANK G. JORDAN
ATTY.

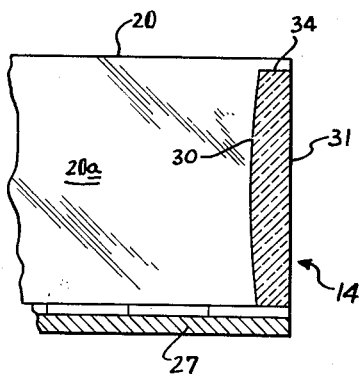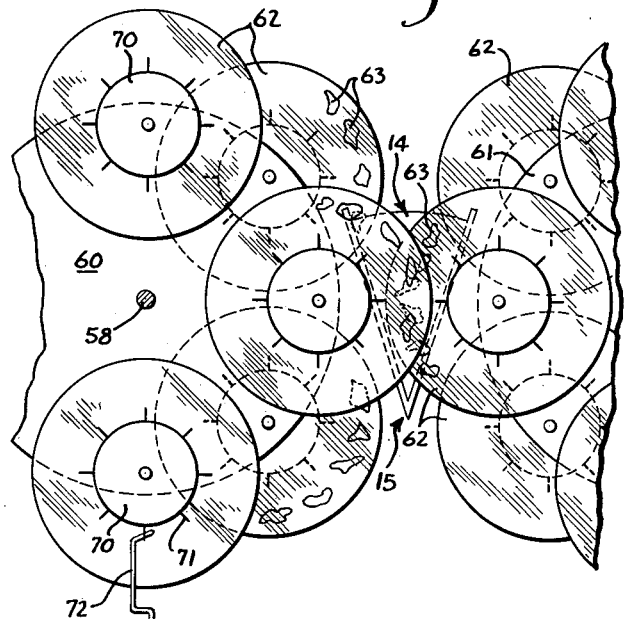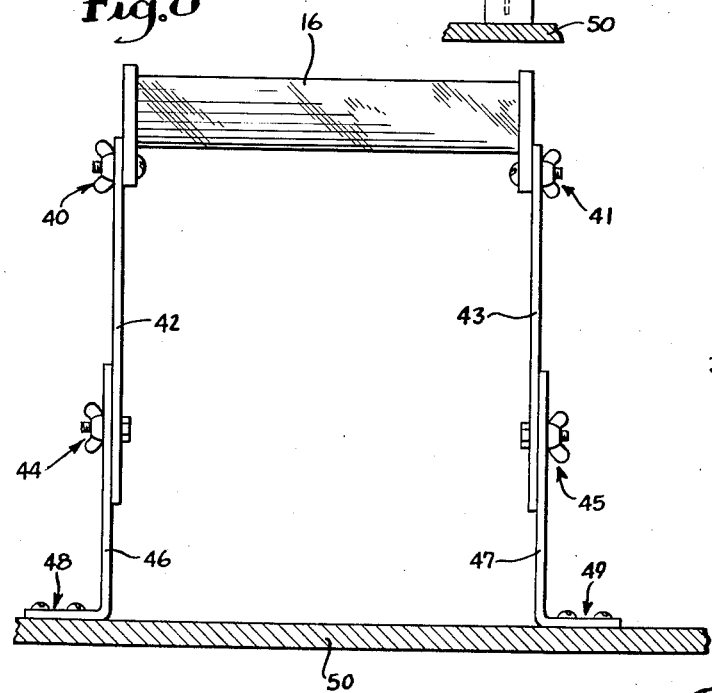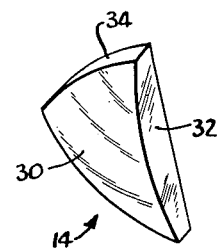

ial Apr. 24, 1962

3,030,856
KALEIDOSCOPE PROJECTING APPARATUS
Frank G. Jordan, 3943 W. Diversey Ave., Chicago, Ill.
Filed July 14, 1958, Ser. No. 748,196
6 Claims. (Cl. 88—24)

This invention relates to a kaleidoscopic projection device and more particularly to novel lens means for producing a geometrical pattern of unvarying brilliance throughout its entire area.

This is a continuation in part of my application No. 575,487, filed April 2, 1956, now abandoned, entitled Kaleidoscope Projecting Apparatus.

In projecting a geometrical pattern on a screen by means of a kaleidoscope, difficulties have arisen in generating a pattern equally brilliant over its entire area. This variation in light intensity is believed due to a variation in the amount of reflection undergone by respective light rays as they travel between the dihedral mirror surfaces of the kaleidoscope.

This disparity in pattern intensity has been eliminated by the present invention. The present invention contains novel lens means which deflects and distributes the light rays between the dihedral mirrors in such a manner as to effectively eliminate the undesirable variation. The novel lens means comprises a wedge-shaped planar-convex lens with polished side portions forming an angle corresponding to that formed by the dihedral mirrors. This lens is positioned between the dihedral mirrors at the end nearest the light source and has its polished side portions contacting the adjacent mirrors and its convex surface facing the opposite end. When so positioned this lens will deflect light rays between the mirrored surfaces in such a distribution as to effectively eliminate noticeable variations in the intensity of the resulting projected pattern.

For optimum results a rather precise deflection and distribution of light between the mirrors is necessary. Other lens means positioned between the wedge-shaped lens and the light source may be used to shape and deflect the light beam before it enters the wedge-shaped lens and thus further facilitate the desired distribution and deflection.

It should be noted that positioning the wedge-shaped planar-convex lens between the dihedral mirrors adjacent the end nearest the light source is essential in order to produce a pattern of unvarying circumferential brilliance. If the lens were moved back out of the mirrors the resulting projected pattern would have regularly intermittent dark areas radiating out from the center. Similarly, failure to polish the side portions of the wedge-shaped lens will result in corresponding dark areas radiating from the center of the projected pattern.

The present invention further features a novel pattern disc arrangement which enables the generation of a large variety of changing patterns for projection on a screen.

In the drawings:

FIG. 1 is a schematic view of the kaleidoscopic projection device featured in the present invention.

FIG. 2 is a side-elevational view, partly in section, of the kaleidoscopic projection device.

FIG. 3 is a rear view of one of the main pattern discs featured in the present invention.

FIG. 4 is a front-sectional view of dihedral mirrors containing the novel wedge-shaped lens featured in the present invention.

FIG. 5 is a sectional view taken on line 5—5 of FIG. 4.

FIG. 6 is a perspective view of the novel wedge-shaped lens.

FIG. 7 is a rear view of a pattern disc assembly for producing a large variety of patterns.

FIG. 8 is a front view of an adjustable prism assembly used in the present invention.

Referring now to FIGS. 1 and 2 the numeral 11 indicates a light-source resting on a floor portion 50. Light is projected from light source 11 through a lens 13 toward a translucent pattern generally indicated at 12. After passing through pattern 12 the light beam is passed through a second lens 14 seated between a pair of dihedral mirrors 15. The light then passes reflectively between mirrors 15 after which it is deflected by a prism 16 and a lens 17 onto a screen 18 to form a projected pattern 10.

As is well known in the art of kaleidoscopes, the dihedral reflecting surfaces constitute an essential feature of this type of apparatus. The present invention utilizes two mutually angularly disposed planar elements 20, 21 (FIG. 4) with respective inner mirrored surfaces 20a, 21a. Elements 20, 21 are pivotally mounted at their vertex 22 to enable adjustment of the dihedral angle. The vertex 22 of dihedral mirrors 15 rests on a base 27 from which side portions 25, 26 extend upwardly. Adjustable screws 23, 24 are inclined upwardly from side portions 25, 26 for supporting elements 20, 21 and may be rotated to vary the dihedral angle. Referring to FIG. 2, base 27 rests on a front vertical support 28 and a rear adjustable support 29. Adjustable support 29 is mounted to floor portion 50 by conventional fastening means, generally indicated at 38, and may be vertically adjusted so as to vary the longitudinal angular disposition of dihedral mirrors 15. This adjustment enables a variation in the relative positions of dihedral mirrors 15 and light rays passing therethrough which is helpful in obtaining the optimum projected pattern.

As seen in FIG. 2, mounted between dihedral mirrors 15 at that end closest to light source 11 is a wedge-shaped lens segment 14. Referring to FIGS. 4, 5 and 6 lens segment 14 has a convex front surface 30 and a planar rear surface 31. It also has polished side portions 32, 33 and a convex top portion 34. Lens segment 14 has an angle corresponding to that formed by elements 20, 21 and thus fits snugly between the mirrored surfaces 20a, 21a. As see in FIG. 4, when lens 14 is thus positioned, it covers substantially the entire aperture between dihedral mirrors 15.

Referring to FIG. 2, positioned immediately in front of the light source is a bi-convex lens 13. Bi-convex lens 13 is mounted on a member 36 rising vertically from floor portion 50. When thus mounted the axis of lens 13 is co-linear with the vertex 22 of dihedral mirrors 15.

As previously indicated light which has passed through lens 13 and the translucent pattern 12 is deflected by lens 13 toward lens 14. Partly because of the resulting deflection and distribution of the light rays by lens 13, but primarily because of the manner in which lens 14 further deflects and distributes the light rays between the dihedral mirror surfaces, there is resultingly produced a beam of light with substantially unvarying intensity throughout its entire cross-section.

A screen 18 may be provided for displaying the resulting pattern as at 10 (FIG. 1). To insure optimum projection of pattern 10 upon screen 18 there is provided prism means 16 and bi-convex lens 17 mounted forwardly of mirrors 15. As shown in FIG. 8, prism means 16 is mounted for adjustable rotational displacement between a pair of vertical elements 42, 43 by conventional means generally indicated at 40, 41. Vertical elements 42, 43 are in turn mounted for adjustable vertical displacement along a pair of brackets 46, 47 by conventional pin-slot arrangements generally indicated at 44, 45. (Also shown in FIG. 2.) Brackets 46, 47 are fastened to floor portion 50 by conventional means generally indicated at 48, 49.

Bi-convex lens 17 may be positioned to either side of prism 16. FIG. 2 shows lens 17 mounted forwardly of prism 16 on a vertical support 51 which, in turn, extends upwardly from floor portion 50. When thus mounted, the axis of lens 17 is substantially co-linear with the axis of the light beam as it emerges from light source 11. This arrangement provides a more compact kaleidoscope.

In the embodiment illustrated in FIG. 2, prism 16 is preferably positioned so that it deflects light leaving dihedral mirrors 15 into the upper half, only, of lens 17. This has been found to produce a more desirable projected pattern.

Referring to FIG. 7 the pattern disc apparatus featured in this invention comprises two main discs 60, 61, each mounted rearwardly and on respective opposite sides of dihedral mirrors 15. Mounted around the periphery of each disc 60, 61 are a plurality of smaller discs 62. Regularly spaced around the periphery of each smaller disc 62 is a plurality of translucent patterns 63.

Main discs 60, 61 are similarly mounted. FIG. 2 shows main disc 61 to be rotatably mounted on a shaft 58 which is driven by a motor 75. As shown in FIG. 3 the driving motor 75 is mounted on horizontal arm 65. Arm 65 projects laterally from a vertical member 66 and is mounted for adjustable horizontal displacement by conventional pin-slot means generally indicated at 67. Member 66 is similarly mounted at 68 for adjustable vertical displacement. By means of horizontal adjustment 67 and vertical adjustment 68 a translucent pattern 63 on each of the main discs 60, 61 may be situated to overlie a central portion of lens 14 simultaneously. In this manner a combination pattern may be produced.

As shown in FIG. 7, each smaller disc 62 has a sprocket arrangement 70 with a plurality of regularly spaced teeth 71. As the main discs 60, 61 rotate one tooth 71 on each disc 62 is engaged by a spring-like whisker 72 so as to rotate its respective smaller disc 62. For each rotation of the main discs 60, 61, every one of their respective smaller discs 62 is rotated through an angle corresponding to that lying between adjacent teeth 71. Consequently, as the main discs 60, 61 continue to rotate a different series of translucent pattern combinations will overlie the central portion of lens 14. This will hold true for only a limited number of rotations, however.

Therefore, means have been provided to further vary the number of pattern combinations. As previously indicated, each disc is rotated by a motor 75. Both discs 60 and 61 are driven in the same direction by their respective motors. However, disc 61 is driven at a slightly faster speed than disc 60. Consequently, as the translucent patterns 63 reach the point where they overlie lens 14 they will be aligned in constantly changing relation, as well as in the aforementioned limited number of combinations.

A bar 80 (FIG. 1) may be rotatably mounted and driven by an electric motor 82. This bar is mounted in such a position that it will cut through the path of the light rays emanating from light source 11. The bar may be formed of translucent colored material which modifies and influences the color patterns produced by the rotating pattern discs. This modification further enables variation of the projected pattern design.

It is to be understood that the specific embodiments of the invention shown in the drawings and described above are merely illustrative of several of the many forms which the invention may take in practice. They are not to be construed as limiting the scope of the invention as defined in the appended claims which are to be interpreted as broadly as possible in view of the prior art.

I claim:

1. A kaleidoscope projection device comprising dihedral reflecting mirror surfaces forming an elongated open-end trough of predetermined interior angle, said trough having one end for light entry and its other end for light egress, a wedge-shaped converging lens of less length than and having the same angle as said trough seated in the light entry end of said trough, said lens having two polished side faces positioned against said mirrored surfaces, a planar surface facing said light-entry end and a convex surface facing the interior of the trough, a light source for projecting rays of light toward the light-entry end and through said lens, multi-colored changeable pattern means at the light-entry end of said trough and through portions of which all light rays pass prior to entering said converging lens, and light collector means at the light-egress end of said trough and through which said light rays are projected to form a kaleidoscope pattern on a surface.

2. A kaleidoscopic projection device comprising dihedral reflecting mirror surfaces forming an open ended elongated trough of predetermined interior angle, said trough having one end disposed for light-entry and its other end for light-egress and being inclined downwardly in the direction of its light-egress end, a wedge-shaped converging lens having the same angle as said trough and having two polished side surfaces seated against said mirrored surfaces at said light-entry end, a first main disc rotatably mounted closely adjacent to said light-entry end on an axis substantially parallel to the axis of the elongated trough, a second main disc rotatably mounted closely adjacent to said first main disc and on an axis parallel to the axis of the first main disc, a plurality of smaller translucent color discs rotatably mounted around the peripheral margins of each of said main discs having their peripheral margins extend beyond the periphery of the respective main disc, a plurality of clear patterns spaced around the peripheral margins of the smaller discs, means for rotating said first main disc at a first rate of speed, means for rotating said second main disc at a second rate of speed, said first and second main discs being so mounted that the peripheral patterns of one of the small discs on each main disc overlie the light-entry end of said trough, means for intermittently rotating said small discs in relation to their main discs while the main discs are being rotated and while said small discs are out of register with the light-entry end of said trough, and focusing means at the light-egress end of said trough for diffusing projected light rays in a manner to effect uniform distribution of said projected light rays over a circular pattern.

3. A kaleidoscopic projection device comprising dihedral reflecting mirror surfaces forming an open ended elongated trough of predetermined interior angle, said trough having one end disposed for light entry and its other end for light-egress, a wedge-shaped converging lens having two polished side surfaces positioned one against each mirrored surface of said trough at said light-entry end, a first main disc rotatably mounted closely adjacent to said light-entry end on an axis parallel to the axis of the elongated trough, a second main disc rotatably mounted closely adjacent to said first main disc and on an axis parallel to the axis of the first main disc, a plurality of different colored translucent smaller discs rotatably mounted around the peripheral margins of each of said main discs and having their peripheral margins extend beyond the periphery of the respective main disc, a plurality of apertures of irregular configuration in the peripheral margins of the smaller discs, means for rotating said first main disc at a first rate of speed, means for rotating said second main disc at a second rate of speed, said first and second main discs being so mounted that the peripheral patterns of the small discs on each main disc pass over the light-entry end of said trough, and means for intermittently rotating said small discs in relation to their main discs and during main disc rotation while said small discs are out of register with the light-egress end of said trough so as to cause superimposition of various color and pattern combinations over the light-entry end of the trough for projecting continuously changing kaleidoscope patterns on a surface.

4. A kaleidoscopic projection device comprising dihedral reflecting mirror surfaces forming an open ended elongated trough of predetermined interior angle, said trough having one end disposed for light-entry and its other end for light-egress, a wedge-shaped converging lens having the same angle as said trough and having two polished side surfaces seated against said mirrored surfaces at said light-entry end, first and second main discs rotatably mounted closely adjacent to said light-entry end on spaced axes one on each side of the elongated trough, a plurality of smaller light transmitting discs rotatably mounted around the peripheral margins of each of said main discs and having their peripheral margins extend beyond the periphery of the respective main disc, said smaller discs being of different colors and each having a plurality of irregularly shaped clear patterns spaced around the peripheral margins of each of said smaller discs, means for rotating said first and second main discs at different rates of speed, said first and second main discs being so mounted that a respective one of the peripheral patterns on one of the small discs on one of said main discs move in a path that overlies the path of the peripheral pattern of one of the small discs on the other main disc and both of which overlie the light-entry end of said trough, and means for intermittently rotating said small discs in relation to their main discs while said main discs are being rotated and while the small discs are out of register with the light-entry end of said trough so as to cause smooth transmission of an uninterrupted series of constantly changing kaleidoscope patterns to be disposed in the path of light entering the light-entry end of said trough.

5. A kaleidoscopic projection device comprising dihedral reflecting mirror surfaces forming an open ended elongated trough of predetermined interior angle, said trough having one end disposed for light-entry and its other end for light-egress, a lens arranged inwardly of said light-entry end of said trough, a pair of main discs rotatably mounted closely adjacent to said light-entry end on axes parallel to but spaced from the axis of said trough, a plurality of smaller discs rotatably mounted around the peripheral margins of said main discs and having their peripheral margins extend beyond the periphery of said main disc, said smaller discs being of different colors and translucent, a plurality of randomly spaced openings around the peripheral margins of the smaller discs, means for rotating said main discs, said main discs being so mounted that the peripherally arranged patterns of said discs coincide with each other and successively pass across the light-entry end of said trough, and means for intermittently rotating said small discs in relation to the main discs while said main discs are being rotated and while said small discs are out of register with the light-entry end of said trough so as to generate a continuously changing color pattern in the path of light entering the light-entry end of said trough, and a prism adjacent to the light-egress end for collecting light rays passing therefrom and distributing them with substantial uniform brilliancy in a kaleidoscope pattern.

6. A kaleidoscope projection device comprising dihedral reflecting mirror surfaces forming an open ended elongated trough of predetermined interior angle, said trough having one end disposed for light-entry and its other end for light-egress, a wedge-shaped converging lens having the same angle at said trough and having two polished side surfaces seated against said mirrored surfaces at said light-entry end, a first main disc rotatably mounted closely adjacent to said light-entry end on an axis substantially parallel to but spaced from one side of the axis of the elongated trough, a second main disc rotatably mounted closely adjacent to said first main disc and on an axis parallel to but spaced from the axis of said first main disc, a plurality of smaller discs of colored light-transmitting material rotatably mounted around the peripheral margins of each of said main discs and having their peripheral margins extend beyond the periphery of the respective main disc, a plurality of unobstructed patterns circumferentially spaced around the peripheral margin of each of the smaller discs, means for rotating said first and second main discs at different rates of speed, said first and second main discs being so mounted that the peripheral patterns of one of the small discs on each main disc register with each other as they advance across the light-entry end of said trough, means for intermittently rotating said small discs in relation to their main discs while said main discs are rotating and while said small discs are out of register with the light-entry end of said trough, a bar of colored transparent material rotatably mounted adjacent to said main discs and movable across the path of the light-entry end of said trough, and means for rotating said bar at a speed different than the speeds of rotation of the main discs, said smaller discs and bar coacting to present constantly changing kaleidoscope patterns in the path of the light-entry end of said trough, and a prisim at the light-egress end of said trough for distributing the projected pattern into a circle of substantial uniform brilliancy.

References Cited in the file of this patent

UNITED STATES PATENTS

| | | |
|---|---|---|
| 1,612,881 | Pierce | Jan. 4 1927 |
| 2,099,904 | Pennington et al. | Nov. 23, 1937 |
| 2,341,223 | Lillie | Feb. 8, 1944 |
| 2,360,822 | Altman | Oct. 24, 1944 |
| 2,440,747 | Higley | May 4, 1948 |
| 2,762,257 | Vacher | Sept. 11 1956 |

FOREIGN PATENTS

| | | |
|---|---|---|
| 11,642 | Australia | of 1933 |
| 491,585 | Great Britain | Sept. 5, 1938 |
| 1,051,825 | France | Sept. 23, 1953 |